United States Patent
Cohen

(10) Patent No.: US 6,389,032 B1
(45) Date of Patent: May 14, 2002

(54) INTERNET VOICE TRANSMISSION

(75) Inventor: Ran Cohen, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/249,586

(22) Filed: Feb. 11, 1999

(51) Int. Cl.⁷ .......................... H04L 1/00; H04L 12/26; H04J 3/14; H04J 1/16; H04J 2/06

(52) U.S. Cl. .................. 370/412; 370/235; 370/252; 370/471; 370/516

(58) Field of Search ................. 370/235, 216, 370/252, 266, 391, 394, 395, 392, 389, 412, 429, 428, 471, 474, 516; 710/56; 704/201, 262

(56) References Cited

U.S. PATENT DOCUMENTS

| | | | |
|---|---|---|---|
| 4,453,247 A | * 6/1984 | Suzuki et al. | 370/252 |
| 4,538,259 A | 8/1985 | Moore | |
| 4,607,363 A | 8/1986 | Platel et al. | |
| 4,841,574 A | * 6/1989 | Pham et al. | 704/201 |
| 4,864,495 A | * 9/1989 | Inaba | 710/56 |
| 4,920,534 A | 4/1990 | Adelmann et al. | 370/474 |
| 5,140,584 A | * 8/1992 | Suzuki | 370/235 |
| 5,384,772 A | * 1/1995 | Marshall | 370/516 |
| 5,563,885 A | * 10/1996 | Witchey | 370/391 |
| 5,659,541 A | * 8/1997 | Chan | 370/236 |
| 6,157,653 A | * 12/2000 | Kline et al. | 370/412 |
| 6,212,206 B1 | * 4/2001 | Ketcham | 370/516 |

OTHER PUBLICATIONS

Werner Verhelst, et al., "An Overlap–Add Technique Based on Waveform Similarity (WSOLA) for High Quality Time–Scale Modification of Speech", IEEE International Conference on Acoustics Speech and Signal Processing, pp. II–554–II–557, 1993.

David Malah, "Time–Domain Algorithms for Harmonic Bandwidth Reduction and Time Scaling of Speech Signals", IEEE Transactions on Acoustics, Speech, and Signal Processing, vol. ASSP–27, No. 2, Apr. 1979, pp. 121–133.

* cited by examiner

Primary Examiner—Wellington Chin
Assistant Examiner—M. Phan
(74) Attorney, Agent, or Firm—Darby & Darby

(57) ABSTRACT

A method of providing audio packets received from a network to a speaker which plays the packets. The method includes accumulating the received audio packets in a buffer having a variable size, calculating a parameter indicative of a feature of data flow in the network, adjusting the size of the buffer responsive to the parameter, and providing the speaker with audio packets from the buffer.

28 Claims, 4 Drawing Sheets

INTERNET VOICE TRANSMISSION

FIELD OF THE INVENTION

The present invention relates generally to data transmission, and specifically to transmission of audio data over multiple-node networks.

BACKGROUND OF THE INVENTION

The Internet is widely used for transmission of data in various forms. In most cases, the Internet and other multi-node communication networks provide best-effort service, in which the transmitted data is divided into a plurality of packets which are sent over the network without any guarantee as to the transmission time or successful delivery of the transmission to its destination. Thus, some of the packets may not arrive, and others may arrive out of the order in which the packets were sent.

Many Internet sites provide audio data which may be downloaded and played back by a remote user's computer. The user's computer can wait until all the data is received before playing the audio data, and if some of the packets are not received, the user's computer can request that they be re-transmitted. However, when the audio data is provided on-line, for example, when the audio data includes radio transmissions or telephone conversations, the data cannot be re-transmitted.

U.S. Pat. No. 4,538,259, which is incorporated herein by reference, suggests using a buffer at the receiving computer in which audio data is accumulated before it is played. The buffer allows waiting a fixed amount of time for latecoming packets, thus allowing a higher percentage of the sent packets to arrive at the receiving computer in time to be played. However, as stated in the '259 patent, use of such a buffer causes a delay between receiving the audio data and its playback, a delay which may be very annoying, especially in telephone conversations. It is noted that if the size of the buffer is minimized, the delay is also minimal, but the effectiveness of the buffer is also reduced.

Therefore, the '259 patent suggests delaying a first packet of a conversation at the receiving computer and handling the rest of the packets of the conversation at set intervals from then on. Thus, the rest of the packets are handled as if they arrived early, and extra time is allotted for unexpected delays. The first packet is sent at a high priority so that the unexpected delay of the packet is minimized. However, this method does not handle cases in which the delay causes a first transmitted packet to be received after a succeeding packet.

U.S. Pat. No. 4,607,363, which is incorporated herein by reference, describes a buffer device for transmission of voice signals over a network. The buffer regulates the traffic which is to be transmitted. When the buffer is filled, a number of packets from the buffer are purged. The size of the buffer and the number of purged packets are adjusted with time.

SUMMARY OF THE INVENTION

It is an object of some aspects of the present invention to provide improved methods and apparatus for transmission of real-time audio signals over multi-node communication networks.

It is another object of some aspects of the present invention to provide methods and apparatus for prevention of loss of real-time audio packets transmitted over multi-node communication networks.

It is yet another object of some aspects of the present invention to provide methods and apparatus for receiving and playing real-time audio packets transmitted over a multi-node communication network.

In preferred embodiments of the present invention, a real-time audio receiving unit connected to a network includes an adaptive buffer in which received audio data packets are stored before they are played. The packets are delayed in the buffer for a time dependent on the size of the buffer. The size of the adaptive buffer is adjusted according to characteristics of the network, preferably including a jitter level of transmission of packets through the network. Preferably, when the network has a high jitter level, the delay is set to be relatively long, whereas when the network has a low jitter level, the delay is preferably set to be relatively short. Preferably, the size of the buffer is readjusted each time a data packet is read out from the buffer and/or a data packet is inserted to the buffer.

In some preferred embodiments of the present invention, when the characteristics of the network require enlarging of the buffer, packets of audio data representing silence are inserted into the buffer. Preferably, the silent packets are evenly inserted between the words of the received audio data in the buffer, such that the insertion will be substantially unnoticeable to a listener. Preferably, when the characteristics of the network allow reducing the size of the buffer, the size of the buffer is reduced by removing silent fragments of data and/or recesses which have been left for packets which have not arrived. The discarded fragments are preferably removed from the portion of the buffer closest to being played. Alternatively or additionally, some of the silent fragments are removed from between the words in the buffer in such a manner as to leave the buffer with even spacing of silence between the words. Alternatively or additionally, the size of the buffer is reduced, when necessary, by discarding packets of data.

Alternatively or additionally, the size of the buffer is dynamically adjusted by changing the time used to play each received audio data packet. Preferably, the time of playing the audio data packets is adjusted without affecting the pitch of the audio data, preferably using a Time Domain Harmonic Scaling (TDHS) method, as is known in the art.

There is therefore provided in accordance with a preferred embodiment of the present invention, a method of providing audio packets received from a network to a speaker which plays the packets, including accumulating the received audio packets in a buffer having a variable size, calculating a parameter indicative of a feature of data flow in the network, adjusting the size of the buffer responsive to the parameter, and providing the speaker with audio packets from the buffer.

Preferably, accumulating the packets includes storing the packets in a buffer defined by two pointers, and adjusting the size of the buffer includes moving at least one of the pointers.

Preferably, accumulating the packets includes storing the packets in the buffer responsive to ordering labels in the packets.

Preferably, providing the speaker with the audio packets includes providing the packets substantially independently of a rate of accumulating the packets in the buffer.

Preferably, providing the speaker with the audio packets includes providing the packets after a minimal delay which is dependent on the size of the buffer.

Preferably, calculating the parameter includes calculating the parameter responsive to the accumulation of the received audio packets.

Alternatively, calculating the parameter includes calculating the parameter substantially irrespective of the accumulation of the received audio packets.

Preferably, calculating the parameter includes calculating a jitter of the network.

Preferably, calculating the jitter includes calculating a change in the size of the buffer in two consecutive measurements of the buffer size.

Preferably, calculating the parameter includes calculating the parameter substantially each time the size of the buffer changes due to insertion of a packet thereinto or removal of a packet therefrom.

Preferably, adjusting the size of the buffer responsive to the parameter includes determining a watermark representing a desired size of the buffer.

Preferably, determining the watermark includes changing the watermark if the parameter is not within a desired range of the watermark.

Preferably, determining the watermark includes enlarging the watermark when the data flow in the network is relatively irregular and reducing the watermark when the data flow is relatively regular.

Preferably, adjusting the size of the buffer includes adding or removing one or more leading silent packets in the buffer.

Preferably, adjusting the size of the buffer includes adding or removing one or more silent packets between audio packets representing words in the buffer.

Preferably, adjusting the size of the buffer includes changing the time required to play at least some of the audio data in the buffer.

Preferably, changing the time required to play the audio data includes changing a speed of playing the audio data substantially without effecting the pitch of the resultant audio signals.

There is further provided in accordance with a preferred embodiment of the present invention, apparatus for providing audio packets received from a network to a speaker which plays the packets, including a processor which accumulates the received audio packets in a buffer having a variable size, calculates a parameter indicative of a feature of data flow in the network, adjusts the size of the buffer responsive to the parameter, and provides the audio data to the speaker.

Preferably, the processor defines the buffer using two pointers and adjusts the size of the buffer by moving at least one of the pointers.

Preferably, the processor provides the audio packets to the speaker substantially independently of a rate of accumulating the packets in the buffer.

Preferably, the parameter includes a jitter.

Preferably, the processor updates the parameter each time the size of the buffer changes.

Preferably, the processor determines a watermark which represents a desired size of the buffer.

Preferably, the processor changes the watermark such that the parameter will substantially always be within a desired range of the watermark.

Preferably, the processor enlarges the watermark when the data flow in the network is relatively irregular and reduces the watermark when the data flow is relatively regular.

Preferably, the processor adjusts the size of the buffer by adding or removing one or more leading silent packets in the buffer.

Preferably, the processor adjusts the size of the buffer by adding or removing one or more silent packets between audio packets representing words in the buffer.

Preferably, the processor adjusts the size of the buffer by changing the time required to play at least some of the audio data in the buffer.

There is also provided, in accordance with a preferred embodiment of the present invention, a computer program product having computer readable program code embodied therein, which code causes a computer receiving audio packets over a network to accumulate the received audio packets in a buffer having a variable size and to calculate a parameter indicative of a feature of data flow in the network and adjust the size of the buffer responsive to the parameter, wherein the computer conveys the audio packets to a speaker which plays the packets.

The present invention will be more fully understood from the following detailed description of the preferred embodiments thereof, taken together with the drawings, in which:

DETAILED DESCRIPTION OF PREFERRED EMBODIMENTS

Figure 1:
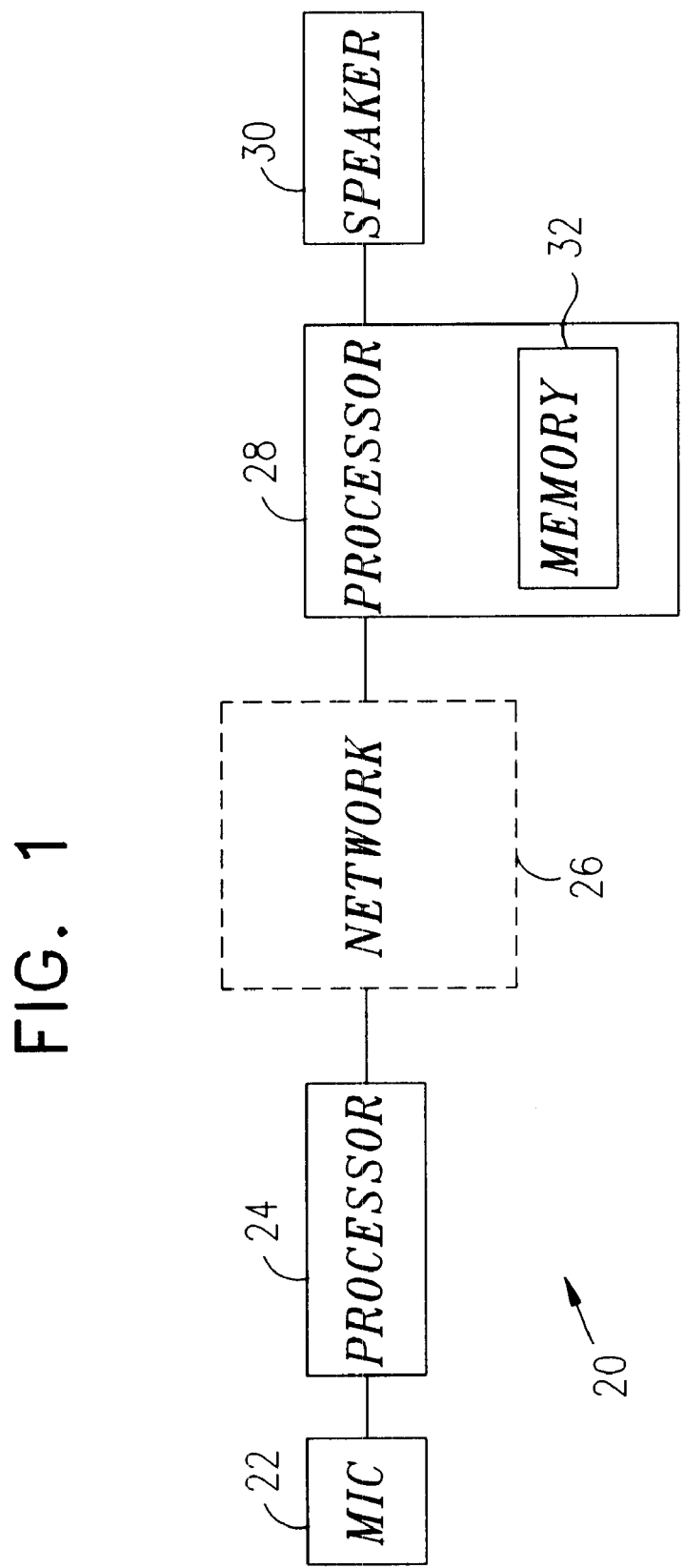
FIG. 1 is a schematic block diagram of a real-time audio transmission system, in accordance with a preferred embodiment of the present invention.

FIG. 1 is a schematic block diagram of a real-time audio transmission system 20, in accordance with a preferred embodiment of the present invention. System 20 includes a microphone 22 through which audio data, such as telephone conversations, radio transmission, etc., is received by the system. A processor 24 processes the audio data and packages it in packets for transmission. The packets may all be of the same size or may be of different sizes. Each packet receives an identification number or range of numbers, which defines the position of the packet in a sequence of packets. The identification number preferably comprises a time stamp, as is known in the art.

The packets are passed through a network 26 to a destination processor 28. Preferably, the packets are passed through network 26 using a connectionless protocol in which receiving processor 28 does not acknowledge receipt of packets. Such a protocol allows simple and speedy transmission of the packets, thus enabling real-time transmission of audio data. Preferably, the protocol used for transmission over network 26 comprises the UDP protocol, which is well known in the art. Processor 28 places the packets in a buffer as described hereinbelow and periodically passes a packet to a speaker 30 to be played, i.e., sounded. Preferably, processor 28 runs a speaker process which provides the audio data to speaker 30, at a rate independent of another process in the processor which manages the buffer.

Figure 2:
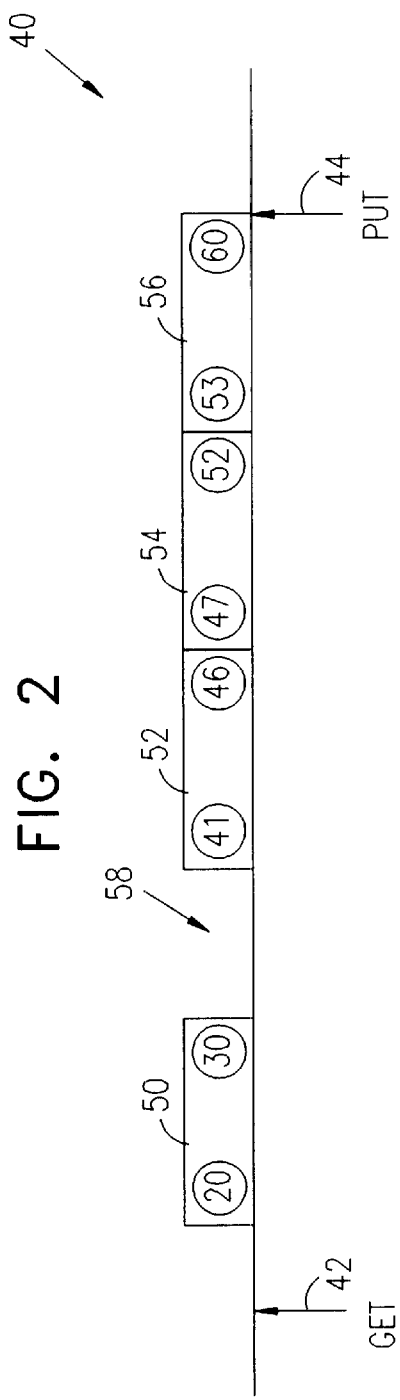
FIG. 2 is a schematic illustration of an adaptive buffer in the system of FIG. 1, in accordance with a preferred embodiment of the present invention.

FIG. 2 is a schematic illustration of an adaptive buffer 40, in accordance with a preferred embodiment of the present invention. Buffer 40 is preferably implemented in a portion of a memory 32 associated with processor 28. Preferably, buffer 40 is defined within the memory by two pointers: a get pointer 42, which defines a memory address from which packets are removed from buffer 40, and a put pointer 44, which defines an address beyond all the packets in the buffer.

When a packet is received by processor 28, it is entered into buffer 40 according to its time stamp relative to the time stamps of the packets already in the buffer. For convenience of representation, buffer 40 is shown schematically as though it is arranged along a time axis running from left to right, with packets in the buffer arrayed along the axis in the order of their time stamps. The terms "left" and "right" in the description that follows make reference to this schematic representation. Preferably, each packet occupies an amount of space in buffer 40 directly dependent on the time required to play the audio data in the packet. For example, buffer 40 in FIG. 2 contains four packets 50, 52, 54 and 56 with time stamps 20–30, 41–46, 47–52 and 53–60, respectively. If an arriving packet has a time stamp between the time stamps of packets within the buffer, e.g., 31–35, the packet is placed in a recess 58 left for this purpose. If recess 58 is not large enough to hold the newly arriving packet, packets neighboring recess 58, e.g., packets 52, 54, and 56, are preferably moved to provide the required room. If necessary, other recesses are overridden, and/or buffer 40 is enlarged.

It is noted that if the new packet has a time stamp placing it before get-pointer 42, the packet is discarded since it should have been played already.

Figure 3:
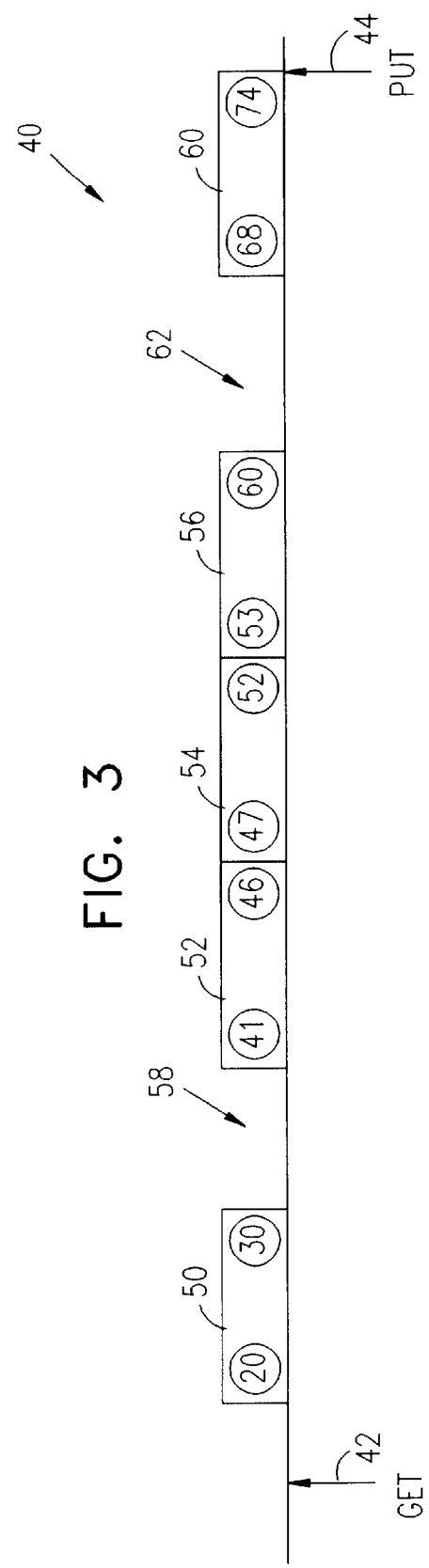
FIG. 3 is a schematic illustration showing the buffer of FIG. 2 receiving a new packet, in accordance with a preferred embodiment of the present invention.

FIG. 3 is a schematic illustration showing addition of a new packet 66 into buffer 40, in accordance with a preferred embodiment of the present invention. Packet 66 has time stamps 68–74. If packet 66 has a time stamp later than the time stamp of packet 56, packet 66 is placed to the right (in FIG. 3) of packet 56, and a recess 62 is left between packet 66 and packet 56. The size of recess 62 is determined according to the difference between the time stamps of packets 56 and 60 66, and if the time stamps indicate the packets are consecutive, recess 62 is preferably of zero length. Put pointer 44 is moved to the right of packet 66, enlarging buffer 40.

When the buffer is empty, for example, when the transmission of the audio data is just beginning, an incoming packet is preferably placed to the right of put pointer 44, and the put pointer is moved to the right of the incoming packet. Preferably, get pointer 42 is moved the same amount as put pointer 44, so that buffer 40 is not enlarged.

In some preferred embodiments of the present invention, processor 28 pre-processes the received packets before they are entered into the buffer. Preferably, the data in the packets are extracted therefrom and are stored in a single data stream. Alternatively or additionally, the audio data is repackaged in packets having logical boundaries, for example, such that each packet contains a single word.

When speaker 30 requires a packet to be played, processor 28 provides speaker 30 with audio data of a required length from an area of buffer 40 adjacent to pointer 42. Thereafter, pointer 42 is moved to a new position immediately beyond the removed audio data. If part or all of the length of buffer 40 adjacent pointer 42 includes silence or is undefined, i.e., includes a recess which was left for a packet which did not arrive, a silent packet is preferably provided to speaker 30.

The length of buffer 40 between pointers 42 and 44 is indicative of a delay which is incurred by packets between the time they are received by processor 28 and the time they are played by speaker 30. The larger the delay, the greater the chances that latecoming packets will arrive on time to be inserted in a recess in buffer 40 before the contents of the latecoming packet are to be played. However, the delay may be annoying, especially when carrying on a two-way telephone conversation. Therefore, the size of buffer 40 is preferably continually adjusted as described hereinbelow to a minimal size required to provide satisfactory performance of system 20.

Preferably, processor 28 defines a variable watermark (WM) which is indicative of a desired length of buffer 40. The WM is preferably changed responsive to one or more parameters relating to a status of the buffer and/or the data flow in network 26. Preferably, the one or more parameters relating to the data flow include a jitter parameter which is indicative of the changes in the size of buffer 40 (or the relative transmission delays of successive packets through the network) over relatively short periods. Preferably, the jitter is calculated as the difference between two measurements of the size of buffer 40 at two relatively close points in time, as described further hereinbelow.

Figure 4:
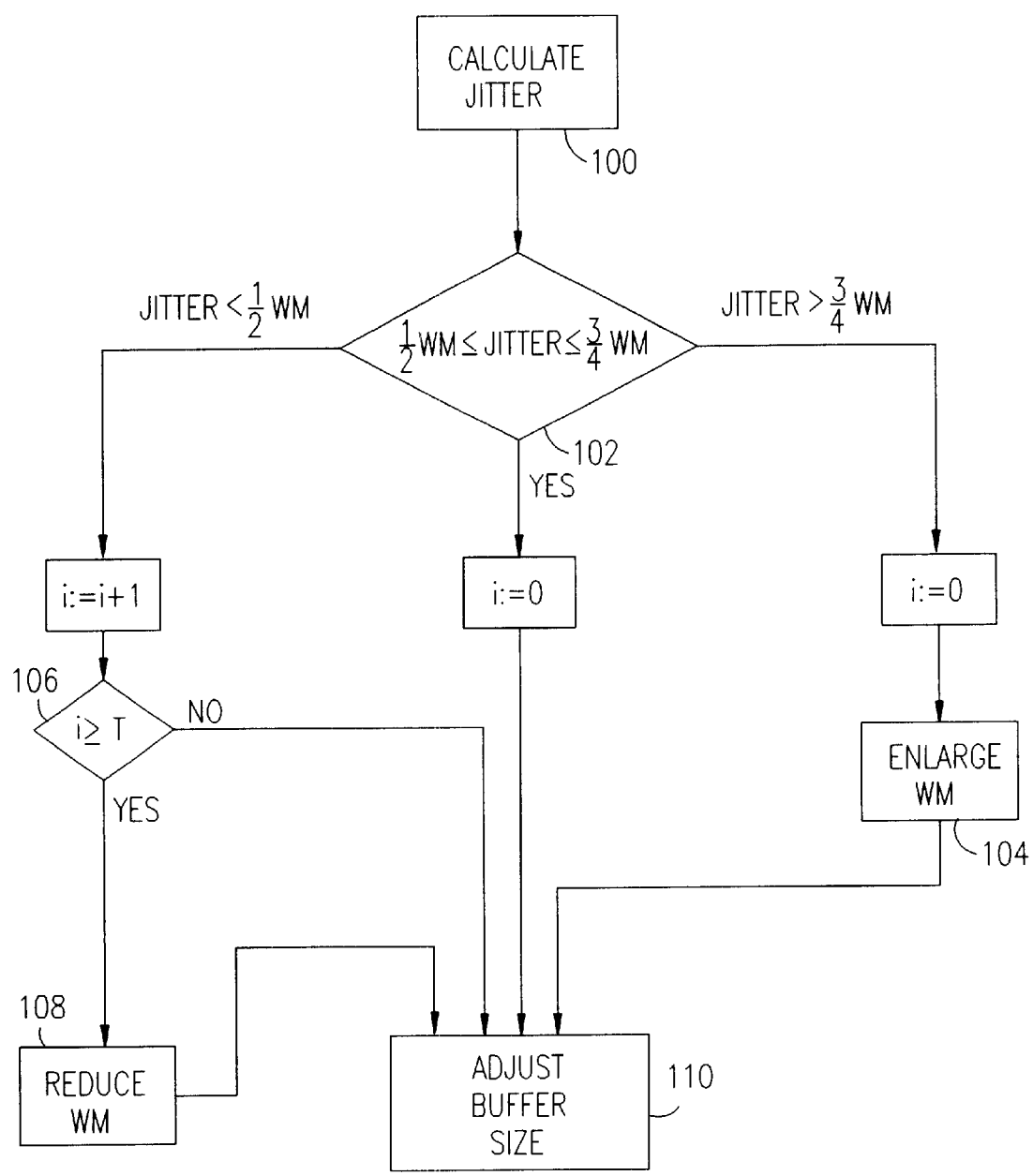
FIG. 4 is a flow chart illustrating a method of calculating a desired buffer size, in accordance with a preferred embodiment of the present invention.

FIG. 4 is a flow chart illustrating of a method of updating WM, for use in adjusting the size of buffer 40, in accordance with a preferred embodiment of the present invention. Preferably, each time either of pointers 42 and 44 is moved, processor 28 performs an update procedure which updates WM and/or the one or more buffer status and/or data flow parameters. Alternatively or additionally, the software procedures are performed each time a packet is entered into or removed from buffer 40 regardless of whether pointers 42 and 44 were moved.

As indicated in block 100, each time the update procedure is invoked, the jitter is calculated as the difference between the current size of buffer 40 and the size of the buffer in a previous invocation of the update procedure, preferably the most recent invocation. Preferably, the calculation is performed in accordance with the following pseudo code:

Previous_size=Current_size
Current_size=Put_pointer−Get_pointer
jitter=|Previous_size−Current_size|

Thereafter, as indicated in block 102, the jitter is compared to WM. If the jitter is relatively large, for example, above 75% of WM, WM is enlarged, as indicated in block 104. Preferably, WM is given a value between 4/3 of the jitter and twice the jitter, most preferably, 1.5 times the jitter.

Conversely, if the jitter is relatively small, for example, less than half of WM, WM may be reduced, as indicated in block 108, preferably to about twice the jitter. Preferably, however, WM is reduced only if the jitter remains at a low level over a predefined period T, as indicated in block 106. Preferably, period T is measured in terms of the number of times the update routine is invoked. Preferably, T is between 5 and 20, and is most preferably equal to about 10.

Preferably, as indicated in block 110, the actual size of buffer 40 is adjusted responsive to changes in WM. Preferably, a buffer adjustment routine which adjusts the size of buffer 40, is called each time the update routine is performed. Alternatively, the buffer adjustment routine is called each time WM is changed.

Figure 5:
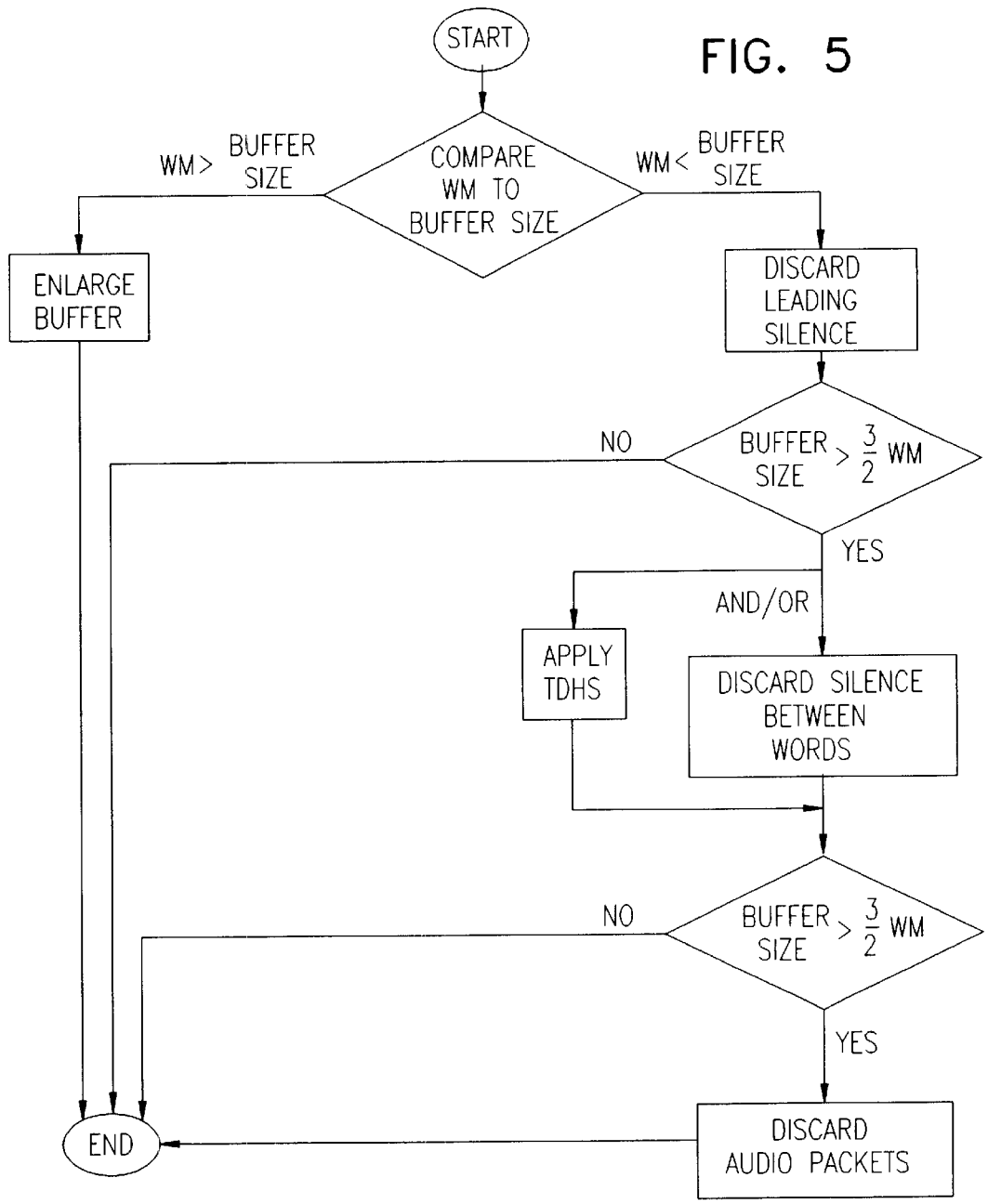
FIG. 5 is a flow chart illustrating a method of buffer adjustment, in accordance with a preferred embodiment of the present invention.

FIG. 5 is a flow chart illustrating the buffer adjustment routine, in accordance with a preferred embodiment of the present invention. If WM is greater than the size of buffer 40, the buffer is preferably enlarged, such that the distance between get and put pointers 42 and 44, equals WM. Preferably, silent packets, i.e., packets containing data corresponding to null audio output, are added to the left of buffer 40, and get pointer 42 is moved to the left. Alternatively or additionally, silent packets are distributed along buffer 40 in such a manner that small packets of silence are inserted between each two words, and the change is hardly noticeable to a listener. Further alternatively or additionally, the playing time of one or more packets in the buffer is enlarged such that the packets occupy more room in the buffer. Preferably, the packets are enlarged using a voice speed-up/slow-down method, such as the TDHS method, which does not change the pitch of the audio signals in the packets. The TDHS method is described, for example, in "Time Domain Algorithms for Harmonic Bandwidth Reduction and Time Scaling of Speech Signals," by David Malah, in *IEEE Transactions on Acoustics, Speech and Signal Processing,* vol. ASSP-27 (April, 1979), pages 121–133, which is incorporated herein by reference.

When WM is smaller than the size of buffer 40, the buffer is preferably reduced in size responsive to the new value of WM determined by the update routine (shown in FIG. 4). Preferably, if the buffer includes one or more leading silent packets and/or empty leading recesses, these packets and/or recesses are discarded until the size of buffer 40 equals WM. If after discarding all the leading silent packets, the size of buffer 40 is still greater than WM, the adjustment routine continues in reducing the size of the buffer only if the size of the buffer is significantly greater than WM. Preferably, the routine continues in reducing the size of the buffer only if the difference between the size of buffer 40 and WM is greater than a predetermined threshold. Preferably, the predetermined threshold is a percentage of WM, preferably between 30% and 70%, most preferably 50%. Alternatively or additionally, the predetermined threshold is a constant value.

Preferably, the routine further reduces the size of buffer 40 by discarding silent packets in between sounded audio packets. Alternatively or additionally, silent segments between words in the buffer are reduced in size. Further alternatively or additionally, the playing time of one or more packets in the buffer is reduced, so that the packets occupy less room in the buffer. Preferably, the packets are reduced using a voice speed-up/slow-down method as described above.

Alternatively or additionally, if the size of buffer 40 is still significantly larger than WM, audio packets are discarded in order to reduce the size of the buffer. Preferably, the audio packets are discarded from the proximity of get pointer 42. Alternatively or additionally, the audio packets are discarded from areas of the buffer in which the audio data packets do not have consecutive time-stamps. Thus, the discarded data is taken from areas in which the data is defective anyway.

It will be understood that software components of the present invention can be sold and/or distributed on computer-readable media, such as diskettes or CD-ROM, as well as in medialess format via a network, for example. It will be further appreciated that the preferred embodiments described above are cited by way of example, and the full scope of the invention is limited only by the claims.

What is claimed is:

1. A method of providing audio packets received from a network to a speaker which plays the packets, comprising:
   accumulating the received audio packets in a buffer having a variable size;
   calculating a parameter indicative of a feature of data flow in the network;
   adjusting the size of the buffer responsive to the parameter; and
   providing the speaker with audio packets from the buffer, wherein calculating the parameter comprises calculating the parameter substantially each time the size of the buffer changes due to insertion of a packet thereinto or removal of a packet therefrom.

2. A method according to claim 1, wherein accumulating the packets comprises storing the packets in a buffer defined by two pointers, and wherein adjusting the size of the buffer comprises moving at least one of the pointers.

3. A method according to claim 1, wherein accumulating the packets comprises storing the packets in the buffer responsive to ordering labels in the packets.

4. A method according to claim 1, wherein providing the speaker with the audio packets comprises providing the packets substantially independently of a rate of accumulating the packets in the buffer.

5. A method according to claim 1, wherein providing the speaker with the audio packets comprises providing the packets after a minimal delay which is dependent on the size of the buffer.

6. A method according to claim 1, wherein calculating the parameter comprises calculating the parameter responsive to the accumulation of the received audio packets.

7. A method according to claim 1, wherein calculating the parameter comprises calculating the parameter substantially irrespective of the accumulation of the received audio packets.

8. A method according to claim 1, wherein calculating the parameter comprises calculating a jitter of the network.

9. A method according to claim 8, wherein calculating the jitter comprises calculating a change in the size of the buffer in two consecutive measurements of the buffer size.

10. A method according to claim 1, wherein adjusting the size of the buffer comprises adding or removing one or more leading silent packets in the buffer.

11. A method according to claim 1, wherein adjusting the size of the buffer comprises adding or removing one or more silent packets between audio packets representing words in the buffer.

12. A method according to claim 1, wherein adjusting the size of the buffer comprises changing the time required to play at least some of the audio data in the buffer.

13. A method according to claim 12, wherein changing the time required to play the audio data comprises changing a speed of playing the audio data substantially without effecting the pitch of the resultant audio signals.

14. A method of providing audio packets received from a network to a speaker which plays the packets, comprising:
    accumulating the received audio packets in a buffer having a variable size;
    calculating a parameter indicative of a feature of data flow in the network;
    adjusting the size of the buffer responsive to the parameter; and
    providing the speaker with audio packets from the buffer, wherein adjusting the size of the buffer responsive to the parameter comprises determining a watermark representing a desired size of the buffer.

15. A method according to claim 14, wherein determining the watermark comprises changing the watermark if the parameter is not within a desired range of the watermark.

16. A method according to claim 14, wherein determining the watermark comprises enlarging the watermark when the data flow in the network is relatively irregular and reducing the watermark when the data flow is relatively regular.

17. Apparatus for providing audio packets received from a network to a speaker which plays the packets, comprising:
    a processor which accumulates the received audio packets in a buffer having a variable size, calculates a parameter indicative of a feature of data flow in the network, adjusts the size of the buffer responsive to the parameter, and provides the audio data to the speaker, wherein the processor updates the parameter each time the size of the buffer changes.

18. Apparatus according to claim 17, wherein the processor defines the buffer using two pointers and adjusts the size of the buffer by moving at least one of the pointers.

19. Apparatus according to claim 17, wherein the processor provides the audio packets to the speaker substantially independently of a rate of accumulating the packets in the buffer.

20. Apparatus according to claim 17, wherein the parameter comprises a jitter.

21. Apparatus according to claim 17, wherein the processor adjusts the size of the buffer by adding or removing one or more leading silent packets in the buffer.

22. Apparatus according to claim 17, wherein the processor adjusts the size of the buffer by adding or removing one or more silent packets between audio packets representing words in the buffer.

23. Apparatus for providing audio packets received from a network to a speaker which plays the packets, comprising:
 a processor which accumulates the received audio packets in a buffer having a variable size, calculates a parameter indicative of a feature of data flow in the network, adjusts the size of the buffer responsive to the parameter, and provides the audio data to the speaker, wherein the processor determines a watermark which represents a desired size of the buffer.

24. Apparatus according to claim 23, wherein the processor changes the watermark such that the parameter will substantially always be within a desired range of the watermark.

25. Apparatus according to claim 23, wherein the processor enlarges the watermark when the data flow in the network is relatively irregular and reduces the watermark when the data flow is relatively regular.

26. Apparatus according to claim 23, wherein the processor adjusts the size of the buffer by changing the time required to play at least some of the audio data in the buffer.

27. A computer program product having computer readable program code embodied therein, which code causes a computer receiving audio packets over a network to accumulate the received audio packets in a buffer having a variable size and to calculate a parameter indicative of a feature of data flow in the network and adjust the size of the buffer responsive to the parameter, wherein the computer conveys the audio packets to a speaker which plays the packets, and wherein the code causes the computer to update the parameter substantially each time the size of the buffer changes.

28. A computer program product having computer readable program code embodied therein, which code causes a computer receiving audio packets over a network to accumulate the received audio packets in a buffer having a variable size and to calculate a parameter indicative of a feature of data flow in the network and adjust the size of the buffer responsive to the parameter, wherein the computer conveys the audio packets to a speaker which plays the packets, and wherein the code causes the computer to determine a watermark which represents a desired size of the buffer.

* * * * *